(12) United States Patent
Bergstein (10) Patent No.: US 9,063,003 B2
(45) Date of Patent: Jun. 23, 2015

(54) RADIATION COMPENSATED THERMOMETER

(71) Applicant: David M. Bergstein, Chino Valley, AZ (US)

(72) Inventor: David M. Bergstein, Chino Valley, AZ (US)

(*) Notice: Subject to any disclaimer, the term of this patent is extended or adjusted under 35 U.S.C. 154(b) by 390 days.

(21) Appl. No.: 13/765,103

(22) Filed: Feb. 12, 2013

(65) Prior Publication Data

US 2013/0329764 A1    Dec. 12, 2013

Related U.S. Application Data

(60) Provisional application No. 61/658,130, filed on Jun. 11, 2012.

(51) Int. Cl.
| | |
|---|---|
| *G01K 1/14* | (2006.01) |
| *G01K 7/04* | (2006.01) |
| *G01J 5/02* | (2006.01) |
| *G01J 5/04* | (2006.01) |
| *G01J 5/08* | (2006.01) |
| *G01J 1/42* | (2006.01) |

(52) U.S. Cl.
CPC ............ *G01J 5/02* (2013.01); *G01J 2001/4266* (2013.01); *G01J 5/047* (2013.01); *G01J 5/0887* (2013.01)

(58) Field of Classification Search
CPC ............ G01K 1/14; G01K 1/026; G01K 7/04
USPC .......................... 374/208, 166, 112, 163, 179
See application file for complete search history.

(56) References Cited

U.S. PATENT DOCUMENTS

| | | | | |
|---|---|---|---|---|
| 2,900,821 | A * | 8/1959 | Rich .............................. | 374/138 |
| 5,141,332 | A * | 8/1992 | Bergstein ...................... | 374/135 |
| 5,172,978 | A | 12/1992 | Nomura | |
| 7,400,975 | B2 * | 7/2008 | Glenn et al. ....................... | 702/2 |
| 7,753,583 | B2 * | 7/2010 | Loose et al. ................... | 374/138 |

FOREIGN PATENT DOCUMENTS

GB     2175693     12/1986

\* cited by examiner

*Primary Examiner* — Mirellys Jagan
(74) *Attorney, Agent, or Firm* — Frederick H. Gribbell (57) ABSTRACT

A radiant compensated thermometer, which uses a pair of parabolic-shaped radiation shields that are spaced-apart from one another. An upper shield is positioned to intercept the sunlight from impacting on a lower shield; both shields have an outer substantially reflective surface and an inner substantially non-reflective surface. A temperature sensor is positioned in a "dead space" near the inner surface of the lower shield, which is cooler than the other areas of the device.

20 Claims, 11 Drawing Sheets

RADIATION COMPENSATED THERMOMETER

CROSS-REFERENCE TO RELATED APPLICATIONS

The present application claims priority to provisional patent application Ser. No. 61/658,130, titled "RADIATION COMPENSATED THERMOMETER," filed on Jun. 11, 2012.

TECHNICAL FIELD

The technology disclosed herein relates generally to temperature measuring equipment and is particularly directed to radiant compensated thermometers. Embodiments are specifically disclosed as a directional radiant heat thermometer, a miniaturized version of a directional radiant heat thermometer, and an omni-directional radiation compensated thermometer. All three embodiments use a pair of spaced-apart, parabolic-shaped radiation shields; there is an upper shield that intercepts the sunlight from impacting on a lower shield. Both shields have an outer substantially reflective surface and an inner substantially non-reflective surface. The upper shield is typically larger in size than the lower shield. A temperature sensor is positioned in a "dead space" near the inner surface of the lower shield, which is cooler than the other areas of the device.

The directional radiant heat thermometer is mounted on a pivotable set of poles that allow the pair of radiation shields to be "aimed" at the sun, so that the larger upper shield provides shade for the smaller lower shield. The pivotable mounting allows the angle of the aimed shields to be changed both in the azimuth and in elevation, to track the sun across the sky. The miniaturized version can be attached to an equatorial mount, again to track the sun across the sky. The omni-directional radiation compensated thermometer is typically to be mounted such that it does not move; the upper shield is spaced more closely to the lower shield, so that the sunlight does not strike the lower shield as the sun transits the sky.

STATEMENT REGARDING FEDERALLY SPONSORED RESEARCH OR DEVELOPMENT

None.

BACKGROUND

An earlier air temperature monitor was patented in 1992 by David M. Bergstein (the present inventor) which, after testing, exhibited an error of about two (2) degrees F., maximum. This is described in U.S. Pat. No. 5,141,332, which issued on Aug. 25, 1992.

A publication by J. Y. Wang and C. M. M. Felton discusses temperature monitors, titled, "Instruments for Physical Environmental Measurements," published in 1983. On pages 127-130, it discusses the fact that radiation error in weather shelters may be up to 3 degrees F., under full sun. Wang and Felton propose an alternate "weather shelter" comprised of two parallel plates that are white facing outside, and black facing inside.

A publication by S. Negri is titled, "Sensors May be Flawed," published in The Arizona Republic, on Oct. 10, 1990. This article concerned installation of the HO83, which was an early artificially aspirated air temperature device. Now known as HO-1088, this device draws air across a temperature sensor. There are some questions as to its accuracy and the necessity of needing the fan during night time hours, which creates erroneous low temperature readings.

The Gill Plate Radiation Shield is another type of air temperature monitor. This multi-plate radiation shield is made from plastic, and it is susceptible to both direct and indirect radiation error. It requires natural airflow to abate higher temperatures that accrue from this being a passive device. Its product literature states a radiation error of 2.7 degrees F. RMS, with 2.2 mph airflow through the shield.

The technology described herein is referred to as a Radiation Compensated Thermometer, which uses the natural thermoelectric emissive characteristics of metal, because metal has more in common with the universe than plastic. This is also a step towards greater integration of sensor and shield.

SUMMARY

Accordingly, it is an advantage to provide a radiation compensated thermometer that uses a pair of spaced-apart curved radiation shields, in which the upper shield is sufficiently large to provide shade for the lower shield, and in which both shields have a substantially reflective outer surface and a substantially non-reflective inner surface, and a temperature sensor is positioned within a "dead space" near the inner surface of the lower shield, where the air temperature is lower.

It is another advantage to provide a radiation compensated thermometer that uses a pair of spaced-apart curved radiation shields, in which the upper shield is sufficiently to large to provide shade for the lower shield, and in which both shields have a substantially reflective outer surface and a substantially non-reflective inner surface; the two shields are mounted to a pole that is pivotable in two directions so that it can be aimed at the sun, as the sun transits the sky.

It is yet another advantage to provide a miniaturized radiation compensated thermometer that uses a pair of spaced-apart curved radiation shields, in which the upper shield is sufficiently large to provide shade for the lower shield, and in which both shields have a substantially reflective outer surface and a substantially non-reflective inner surface; the two shields are mounted to a base that is connected to an equatorial mount, so that the two shields can track the sun, as the sun transits the sky.

It is still another advantage to provide an omni-directional radiation compensated thermometer that uses a pair of spaced-apart curved radiation shields, in which the upper shield is sufficiently large to provide shade for the lower shield, and in which both shields have a substantially reflective outer surface and a substantially non-reflective inner surface; the two shields are mounted in a stationary manner, wherein the upper and lower shields are spaced more closely together, so that the sunlight strikes the outer surface of the upper shield, and does not directly strike the lower shield.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, a radiation compensated thermometer apparatus is provided, which comprises: (a) a substantially circular first radiation shield subassembly, having: (i) a substantially parabolic first substrate, (ii) a first, convex outer substantially thermally reflective coating, (iii) a first, concave inner substantially thermally non-reflective coating, and (iv) a first mounting location, wherein the first substrate exhibits a first diameter; (b) a substantially circular second radiation shield subassembly, having: (i) a substantially parabolic second substrate, (ii) a second, convex outer substantially thermally reflective coating, (iii) a second, concave inner substantially thermally non-reflective coating, and (iv) a second mounting location, to wherein the second substrate exhibits a second diameter that is smaller than the first diameter; (c) a longitudinal member that extends between the first mounting location and the second mounting location, so that the first and second radiation shield subassemblies are mounted such that: (i) the first, concave inner surface and the second, concave inner surface face one another, (ii) the first and second radiation shield subassemblies are spaced-apart from one another, and (iii) the first and second radiation shield subassemblies are in a substantially parallel configuration to one another; (d) wherein the first radiation shield subassembly exhibits a first cool layer area proximal to the first, concave inner surface, and the second radiation shield subassembly exhibits a second cool layer area proximal to the second, concave inner surface, wherein the first and second radiation shield subassemblies are sufficiently separated that the first cool layer area does not significantly interact with the second cool layer area; and (e) a first temperature sensor that is positioned in one of: (i) the first cool layer area, and (ii) the second cool layer area.

In accordance with another aspect, an omnidirectional radiation compensated thermometer apparatus is provided, which comprises: (a) a substantially circular first radiation shield subassembly, having: (i) a substantially parabolic first substrate, (ii) a first, convex outer substantially thermally reflective coating, (iii) a first, concave inner substantially thermally non-reflective coating, and (iv) a first mounting location, wherein the first substrate exhibits a first diameter; (b) a substantially circular second radiation shield subassembly, having: (i) a substantially parabolic second substrate, (ii) a second, convex outer substantially thermally reflective coating, (iii) a second, concave inner substantially thermally non-reflective coating, and (iv) a second mounting location, wherein the second substrate exhibits a second diameter that is smaller than the first diameter by a ratio of at least about 2:1; (c) a longitudinal member that extends between the first mounting location and the second mounting location, so that the first and second radiation shield subassemblies are mounted such that: (i) the first, concave inner surface and the second, concave inner surface face one another, (ii) the first and second radiation shield subassemblies are spaced-apart from one another, and (iii) the first and second radiation shield subassemblies are in a substantially parallel configuration to one another; (d) wherein a longitudinal distance, measured along a portion of a centerline between the first mounting location and the second mounting location, of a spaced-apart gap between an outermost perimeter of the substantially parabolic first substrate and an outermost perimeter of the substantially parabolic second substrate, is less than the first diameter; (e) the first radiation shield subassembly exhibits a to first cool layer area proximal to the first, concave inner surface, and the second radiation shield subassembly exhibits a second cool layer area proximal to the second, concave inner surface; and (e) a first temperature sensor that is positioned in one of: (i) the first cool layer area, and (ii) the second cool layer area.

In accordance with yet another aspect, a directional radiation compensated thermometer apparatus is provided, which comprises: (a) a base structure having a plurality of elongated mounting channels at different locations in a top surface of the base structure; (b) a first reflector/collector assembly, comprising: (i) a first elongated mounting member; (ii) a substantially circular first radiation shield subassembly, having: (A) a substantially parabolic first substrate, (B) a first, convex outer substantially thermally reflective coating, (C) a first, concave inner substantially thermally non-reflective coating, and (D) a first mounting location that attaches the first radiation shield subassembly to the first elongated mounting member, wherein the first substrate exhibits a first diameter; and (iii) the first elongated mounting member being placed into a first channel of the plurality of elongated mounting channels, thereby holding the first radiation shield subassembly at a first distance above the base structure; (c) a second reflector/collector assembly, comprising: (i) a second elongated mounting member; (ii) a substantially circular second radiation shield subassembly, having: (A) a substantially parabolic second substrate, (B) a second, convex outer substantially thermally reflective coating, (C) a second, concave inner substantially thermally non-reflective coating, and (D) a second mounting location that attaches the second radiation shield subassembly to the second elongated mounting member, wherein the second substrate exhibits a second diameter that is smaller than the first diameter; and (iii) the second elongated mounting member being placed into a second channel of the plurality of elongated mounting channels, thereby holding the second radiation shield subassembly at a second distance above the base structure; (d) wherein the first distance is greater than the second distance, so that the first and second radiation shield subassemblies are arranged at different heights; (e) the first and second radiation shield subassemblies are mounted such that: (i) the first, concave inner surface and the second, concave inner surface face one another, and (ii) the first and second radiation shield subassemblies are spaced-apart from one another; (f) wherein the first radiation shield subassembly exhibits a first cool layer area proximal to the first, concave inner surface, and the second radiation shield subassembly exhibits a second cool layer area proximal to the second, concave inner surface, wherein the first and second radiation shield subassemblies are sufficiently separated that the first cool layer area does not significantly interact with the second cool layer area; and (g) a first temperature sensor that is positioned in one of: (i) the first cool layer area, and (ii) the second cool layer area.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

DETAILED DESCRIPTION

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Figure 1:
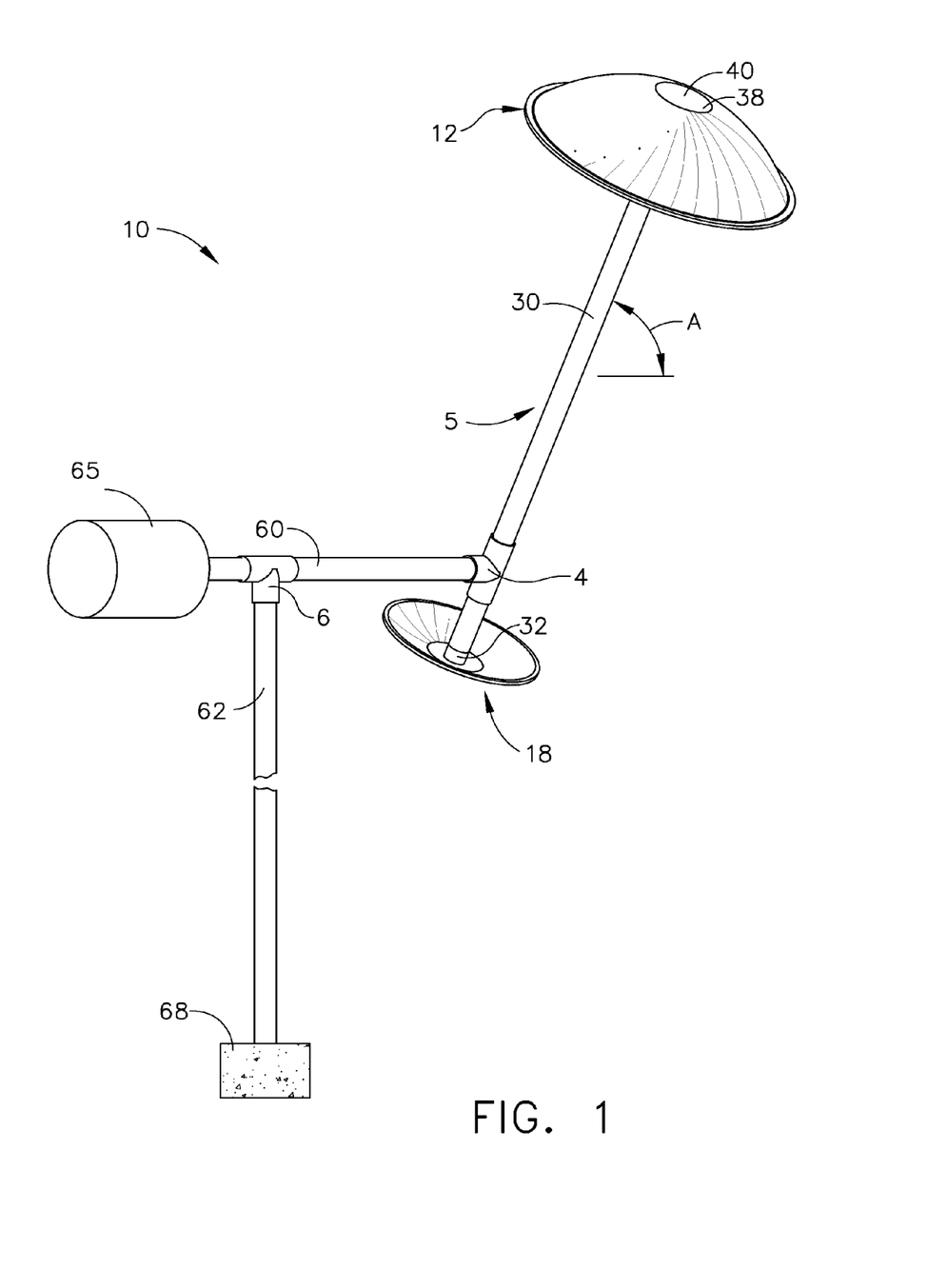
FIG. 1 is a perspective view of a directional radiant heat thermometer, showing its major components, as constructed according to the principles of the technology disclosed herein.

Referring now to the drawings, FIG. 1 shows a device to measure air temperature under full sunlight, generally designated by the reference numeral 10, and constructed in accordance with the technology disclosed herein. The device 10 includes two parabolic reflectors that act as radiation shields, an upper reflector 12, and a lower reflector 18. These radiation shields 12 and 18 are mounted on a longitudinal pole or rod 30, which spaces the shields 12 and 18 at a predetermined distance. The pole 30 can be made of any suitable material, including PVC pipe. In the illustrated embodiment, there is a PVC end cap 32 and a mounting fastener 40 at each end of the pole, which hold the shields in position on the pole 30. See FIG. 3 for greater detail. There is a proximal end and a distal end of the to pole 30, each having one of the end caps 32, as seen in FIGS. 2A and 2B.

In the embodiment of FIG. 1, the pole 30 is mounted to a small tower structure, which includes a base 68, a vertical mounting pole (or rod) 62, a horizontal mounting pole (or rod) 60, and a counterweight 65. The junction of the pole 62 and the pole 60 can swivel (at 6), so the pole 30 may be lined up directly at the sun's azimuth angle as it transits across the sky during the daylight hours. The junction of the pole 60 and the pole 30 also can swivel (at 4), so the pole 30 may be lined up directly at the sun's declination angle as it transits across the sky during the daylight hours.

Figure 1A:
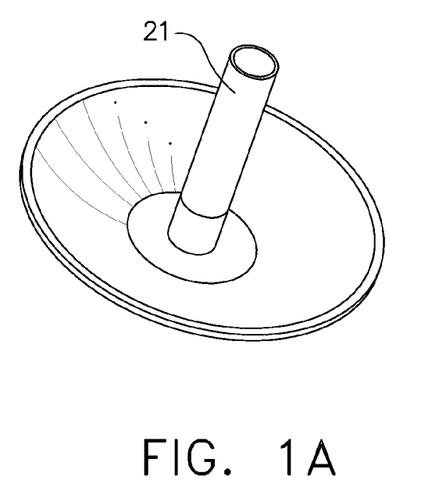
FIGS. 1A and 1B are perspective views of two different mounting bases that could be used for the directional radiant heat thermometer of FIG. 1.
Figure 1B:
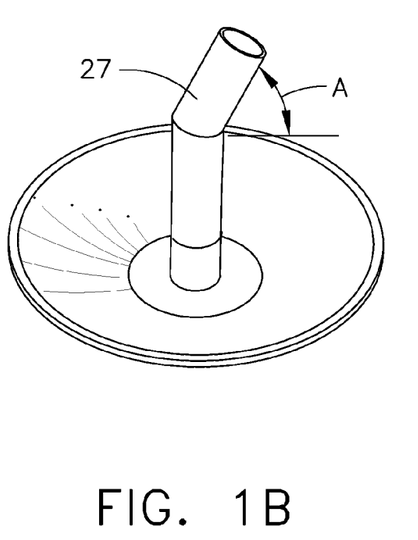
Figure 1C:
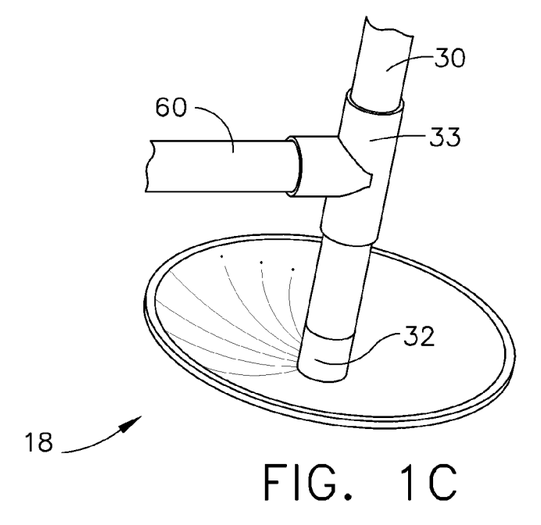
FIG. 1C is a perspective view of certain details for mounting the directional radiant heat thermometer of FIG. 1.

The junction of the pole 60 and the pole 30 also can swivel, so the pole 30 may be positioned at an elevation angle "A" from the horizontal in a range of about 22 to 45 degrees. This allows the pole 30 to be aimed directly at the sun during the daylight, as the sun transits across the sky at varying angles to the horizon. FIGS. 1A and 1B show two alternative mounting schemes for the bottom portion of the pole 30; it can either be straight as in FIG. 1A, or angled as in FIG. 1B. The straight bottom joint 21 will position the bottom shield 18 to be substantially parallel to the top shield 12; the angled bottom joint 27 will position the bottom shield 18 to be more parallel to the ground. FIG. 1C shows certain details of the junction of the pole 30 and the pole 60, using a "T" 33 at the junction.

Figures 2A, 2B:
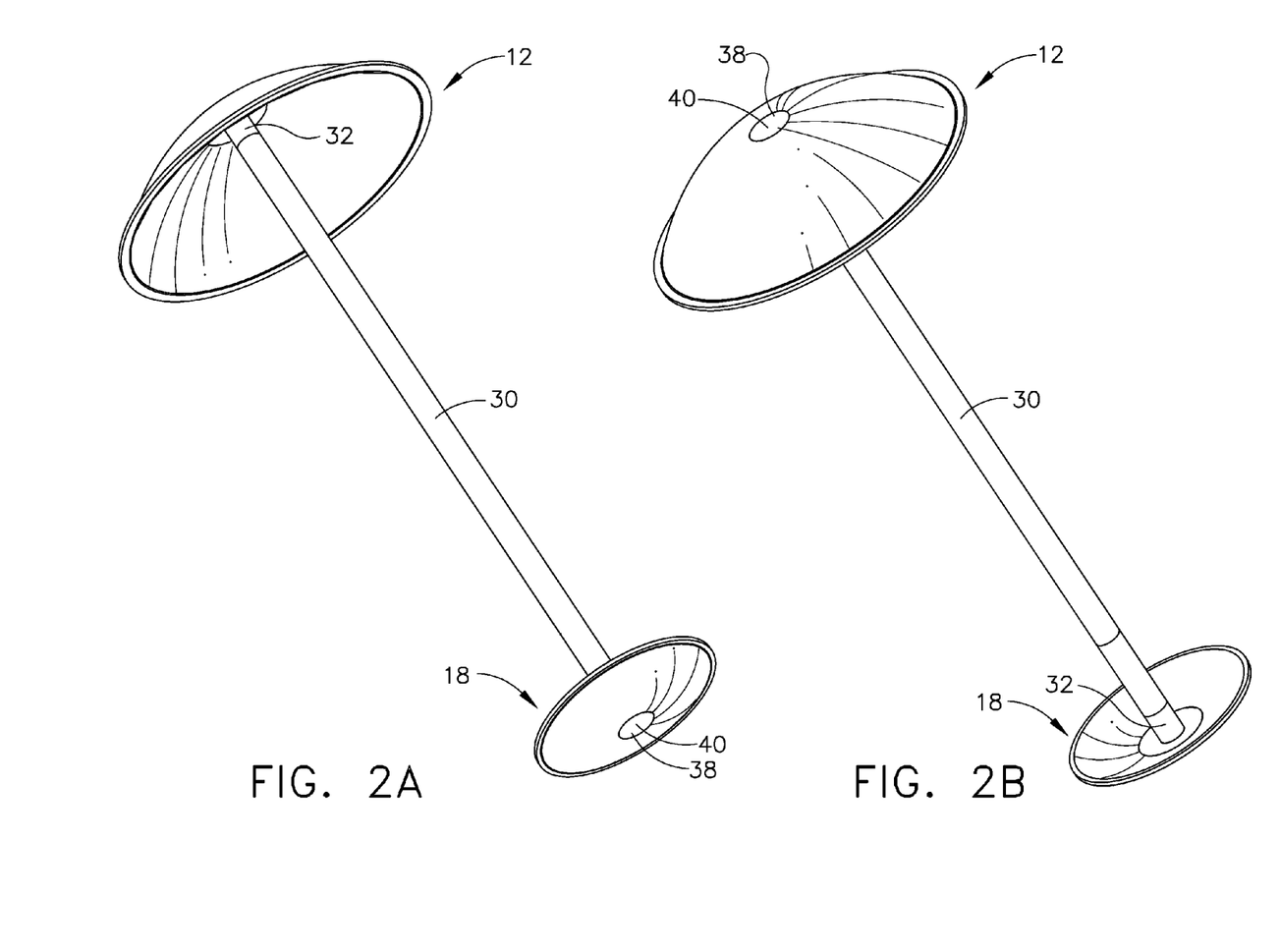
FIG. 2A is a perspective view showing the major portion of the directional radiant heat thermometer of FIG. 1, from below.
FIG. 2B is a perspective view showing the major portion of the directional radiant heat thermometer of FIG. 1, from above.

FIG. 2A shows a major portion 5 of temperature measuring device 10, in which this major portion (or subassembly) 5 includes the radiation shields 12 and 18. Subassembly 5 is part of the device 10 that is designed to measure air temperature under full sunlight. The subassembly 5 includes the two parabolic reflectors that act as radiation shields, i.e., the upper reflector 12, and the lower reflector 18 which nominally is to be at a shaded position. The radiation shields/reflectors 12 and 18 are preferably of a deep-dish (or bowl) parabolic shape. The shields 12 and 18 are mounted to the ends of the pole 30 by use of washers and screws or bolts, with a PVC end cap 32 at both ends of the pole.

Figure 2C:
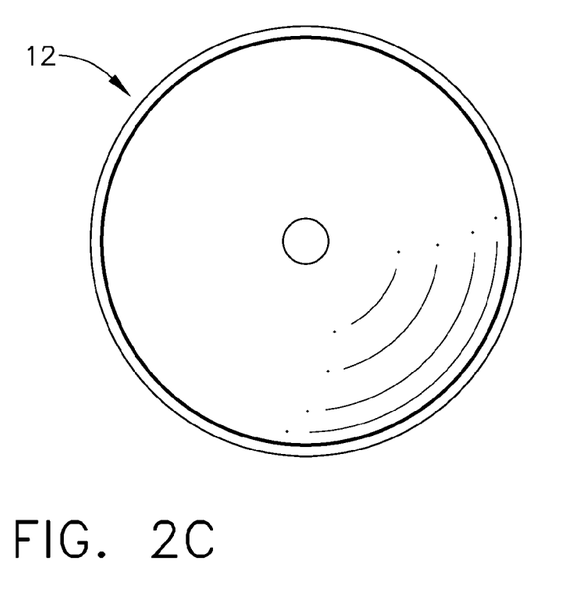
FIG. 2C is a top plan view of the major portion of the directional radiant heat thermometer of FIG. 1.
Figure 2D:
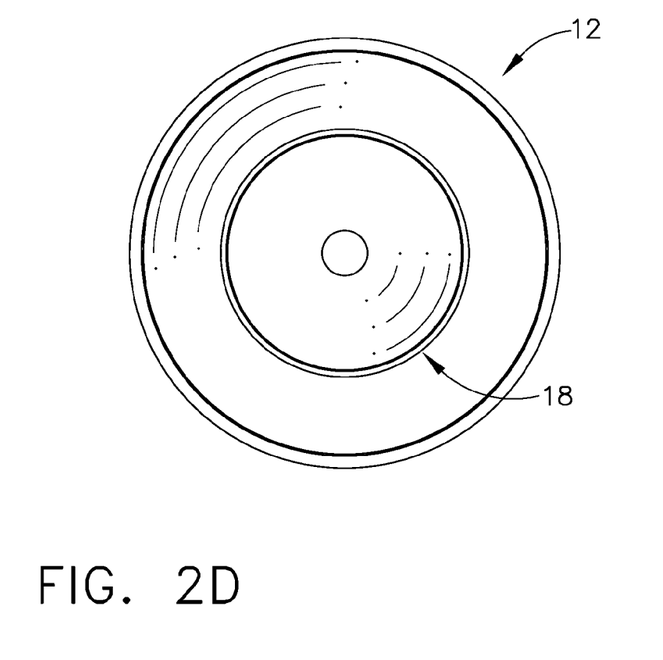
FIG. 2D is a bottom plan view of the major portion of the directional radiant heat thermometer of FIG. 1, showing how the two radiation shields are positioned in parallel to measure air temperature in direct sunlight; this "coupling" shows complimentary shading to by each shield.

Other views of the subassembly 5 are provided in FIGS. 2B and 2C. FIGS. 2A and 2B both show the subassembly 5 in the perspective, FIG. 2A from below and FIG. 2B from above. FIG. 2D directly shows the difference in diameters of the two shields 12 and 18, by showing their respective diameters, as viewed perpendicular to their common centerlines, which are substantially parallel or co-linear to the longitudinal axis of the mounting pole 30. FIGS. 2C and 2D both show the circular outer shape of the "parabolic dish" structures of the two radiation shields 12 and 18, from the perspective that is perpendicular to the longitudinal axis of the mounting pole 30, as seen in FIGS. 2A and 2B. It should be noted, however, that in some embodiments described below, the parabolic dish structure is not always mounted strictly perpendicular with respect to the longitudinal axis of its mounting pole—see FIGS. 4 and 5, for example.

Figure 3:
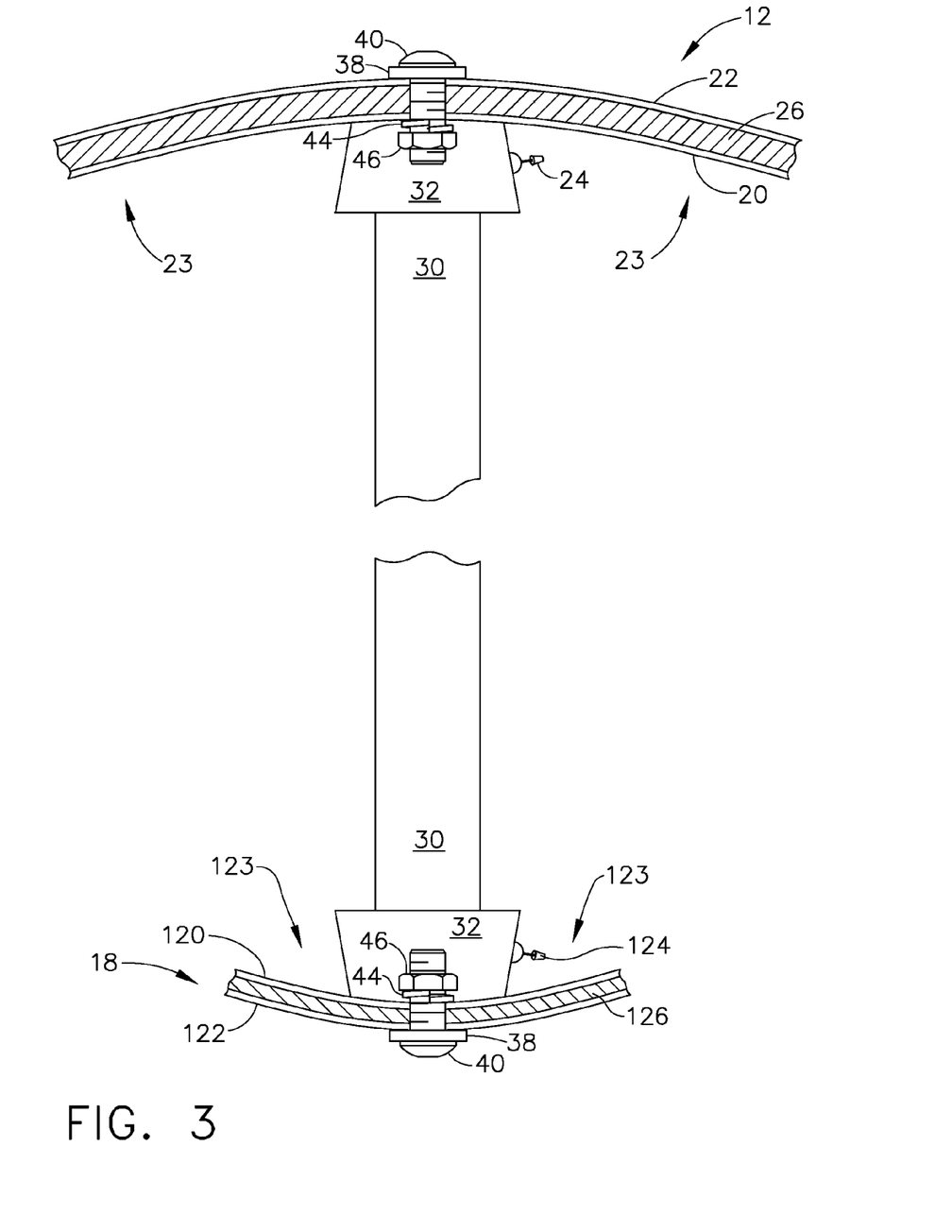
FIG. 3 is a cross-section, elevational view of the major portion of the directional radiant heat thermometer of FIG. 1, shown from the side of the structure along its longitudinal axis; it is not to scale.

An exemplary design, for example as depicted in FIG. 3, can be constructed with the upper shield 12 having a diameter of 24 inches, and the lower shield 18 having a diameter of 12 inches, such that the ratio of their diameters is 2:1. In this exemplary example, the distance between the upper and lower reflectors can be 48 inches.

Some of the other features of this exemplary example of FIG. 3 are: the upper shield 12 is made of, for example, 0.04 inch thick aluminum at 26; its exposed (outer) surface 22 can be coated, for example, with Barium Sulfate (also known as "Blanc Fixe") or with white enamel. The bottom (inner) surface 20 of the upper shield 12 can be coated, for example, with Parson's Optical Black, or with flat black enamel. The lower shield 18 also is made of, for example, 0.04 inch thick aluminum at 126, and its exposed (outer) surface 122 can be coated, for example, with Barium Sulfate (also known as "Blanc Fixe") or with white enamel. The upper (inner) surface 120 of the lower shield 18 can be coated, for example, with Parson's Optical Black, or with flat black enamel. Using other terminology, the upper shield 12 has a substrate 26, an upper reflective layer or coating 22, and a lower non-reflective layer or coating 20; the lower shield 18 has a substrate 126, an upper non-reflective layer or coating 120, and a lower reflective layer or coating 122.

For the upper shield 12, its top surface is to be reflective, while its bottom surface is to be as substantially non-reflective (i.e., black) as economically possible; for the lower shield 18, its bottom surface is to be reflective, while its top surface is to be as substantially non-reflective (i.e., black) as economically possible. These appear to be opposites; however, when considering this structure from another viewpoint, these reflective and black surfaces are virtually identical—for both shields, the outer surfaces are convex and substantially reflective, while the inner surfaces are concave and substantially non-reflective (within the "bowl" of the parabolic shape).

When all of these specifications have been met, under full sun the reflective outer surfaces dissipate radiant heat and luminosity, while the blackened inner surfaces of the shields form cool layers of air where air temperature measurements are to be made. A first temperature probe 24 is mounted in this cool layer area 23 for the upper shield, and a second temperature probe 124 is mounted in a similar cool layer area 123 for the lower shield. The ambient air temperature is measured in two locations, with this arrangement.

The parabolic subassemblies 12 and 18 each have a "collector side" and a "reflector side." The reflector sides are the outermost convex surfaces 22 and 122 of each of the subassemblies 12 and 18, respectively; the collector sides are the inner concave surfaces 20 and 120 of each of the subassemblies 12 and 18, respectively. The reflector sides are the surfaces that are to be exposed to the sun, and which are to be highly reflective. The collector sides are the surfaces that are to be more or less protected from the sunlight, and which are to be essentially black in visual appearance—it is desired that the collector sides thermally act like black body radiating surfaces.

One of the features of the technology disclosed herein is to create a "thermal dead space" where there is little or no air movement; this is the preferred location where a temperature sensor is to be positioned. Using the construction disclosed herein for the directional radiant heat thermometer 10, the lower collector 120 acts as a heat sink, because it "collects" thermal energy from the entire structure that makes up the lower parabolic subassembly 18, and it then dissipates that thermal energy by radiating as a black body, across its entire parabolic surface at 120. With this construction, if the device 10 is aimed properly at the sun, the lower collector 120 will be the coolest member of the entire unit 10, and the "dead space" within its bowl area (i.e., the volume/empty space at the reference numeral 123) is the proper place for temperature probe 124.

Since the lower shield 18 is typically kept from direct exposure to sunlight by the larger upper shield 12, the cool layer area 123 for the lower temperature probe 124 will almost always be at a somewhat lower temperature than the cool layer area 23 for the upper temperature probe 24. The collector surface 120 on the concave side of the lower parabolic body (the lower shield) 18 acts as a thermal heat sink. As noted above, this "collector side" 120 creates a thermal dead space at 123, where there is very little air movement, so it provides a superior location for mounting a temperature sensor. From a practical standpoint, the lower temperature probe 124 is the more useful sensor for taking air temperature readings, and thus the upper temperature probe 24 can be considered optional equipment. On the other hand, having readings available from both temperature probes can be useful to validate the sensing data that is gathered. And over time, there will likely be a fairly repeatable small temperature differential between the two sensor temperature readings, and that data could be used in a situation, for example, where the lower temperature probe has failed, but the upper temperature probe continues to operate.

In the exemplary embodiment of FIG. 3, the preferred air temperature probes 24 and 124 are thermistors, which measure a layer of air temperature inside the bowl or collector towards the center of the parabolic shield. Each reflector/collector combination is attached to a PVC cap 32, fastened by a steel bolt 40 and steel washer 38, then tightened and locked together with a lock-washer 44 and a nut 46.

In the above exemplary embodiment, the two assembled reflector/collectors are positioned at opposing ends of a 48 inch long, one and one-half inch diameter PVC pipe and will have the appearance, when assembled, of FIG. 3. However, it should be noted that FIG. 3 is not to scale, but has exaggerated the size of the mounting hardware for the sake of clarity. In the first embodiment illustrated in FIGS. 1-3, the length of the mounting pole 30 is sufficiently long so that the two "cool layer areas" 23 and 123 do not significantly interact with one another; in other words, they are sufficiently spaced-apart from one another that their two "dead spaces" do not overlap.

It will be understood that, as used herein, the terms "shield," "radiation shield," "collector," "parabolic body," "parabolic reflector," "reflector/collector," and "reflector," all have a similar meaning, and refer to the same types of structures in the various embodiments depicted in the several views. The most generic term for these structures probably is "shield," with regard to one of its functions (of keeping the sunlight away from the inner black surfaces).

Figure 4:
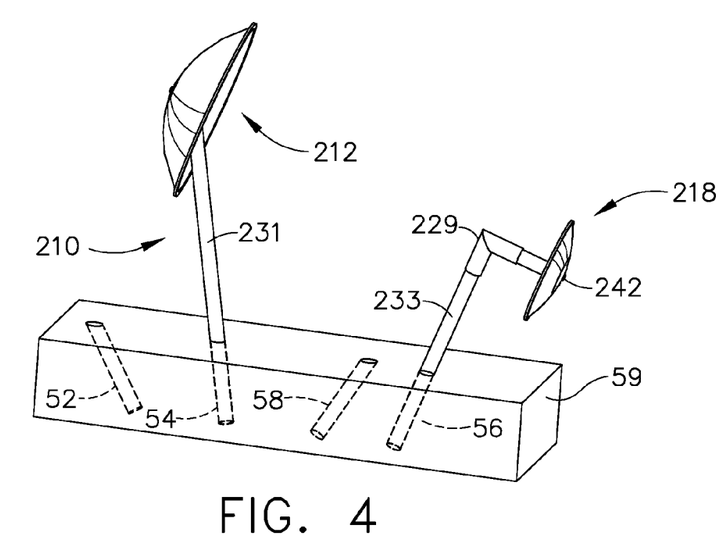
FIG. 4 is perspective view showing a miniaturized version of a directional radiant heat thermometer, as constructed according to the principles of the technology disclosed herein, which could be used with a standard telescope equatorial mount.

Referring now to FIG. 4, a miniaturized radiation compensated thermometer, generally designated by the reference numeral 210, is designed to use the same type of geometry and ratio of sizes between an upper reflector/collector (or shield) 212 and a lower reflector/collector (or shield) 218, as was used in the earlier-described embodiments of FIGS. 1-3. Small mounting poles (or rods) 231 and 233 are placed into mounting channels 54 and 56 of a base 59. It would be desirable to also provide some extra mounting channels in the base 59 at 52 and 58, to compensate for the sun's seasonal decline of transit. To aid in to keeping the overall size fairly small for the unit 210, an angle member 229, which can be adjustable, is provided as part of the pole structure 233 for the smaller ("lower") reflecting shield 218. The mounting components 229, 231, 233, and 59 can be made of any suitable material, such as PVC, DELRIN, or wood, for example.

Figure 5:
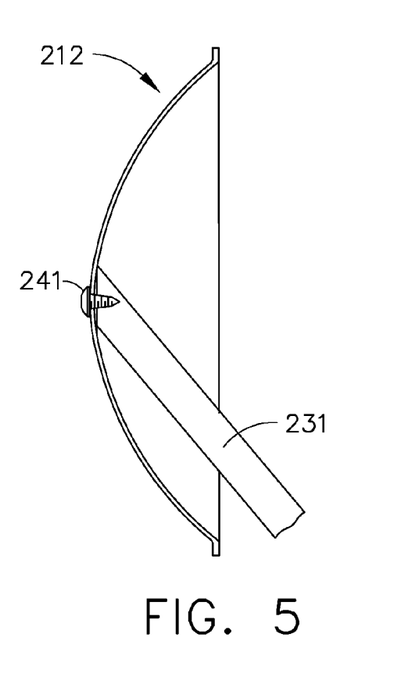
FIG. 5 is a side, elevational view in partial cross-section, showing the retaining screw used for mounting the larger radiation shield of the directional radiant heat thermometer of FIG. 4.
Figure 6:
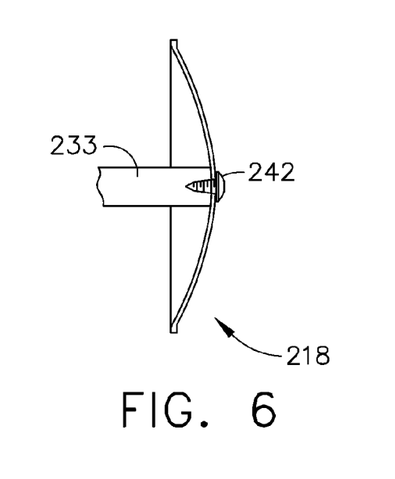
FIG. 6 is a side, elevational view in partial cross-section, showing the retaining screw used for mounting the smaller radiation shield of the directional radiant heat thermometer of FIG. 4.

The radiation shield 212 is mounted on the pole 231 by use of a fastener 241, such as a wood screw, as illustrated in FIG. 5. The radiation shield 218 is mounted on the angle piece 229 by use of a fastener 242, such as a wood screw, as illustrated in FIG. 6. It is better to use smaller mounting hardware components, if possible, so that they don't affect the sensing performance characteristics of the temperature readings to a major extent.

The smaller size of the miniaturized unit 210 may be more sensitive to change than the larger unit 10. In other words, the smaller unit 210 will likely have a faster response time than the larger unit 10, and perhaps with less extraneous noise in the temperature readings. Again, the retaining screws 241 and 242 should be small, because of the increased sensitivity of this miniaturized unit 210.

Figure 7:
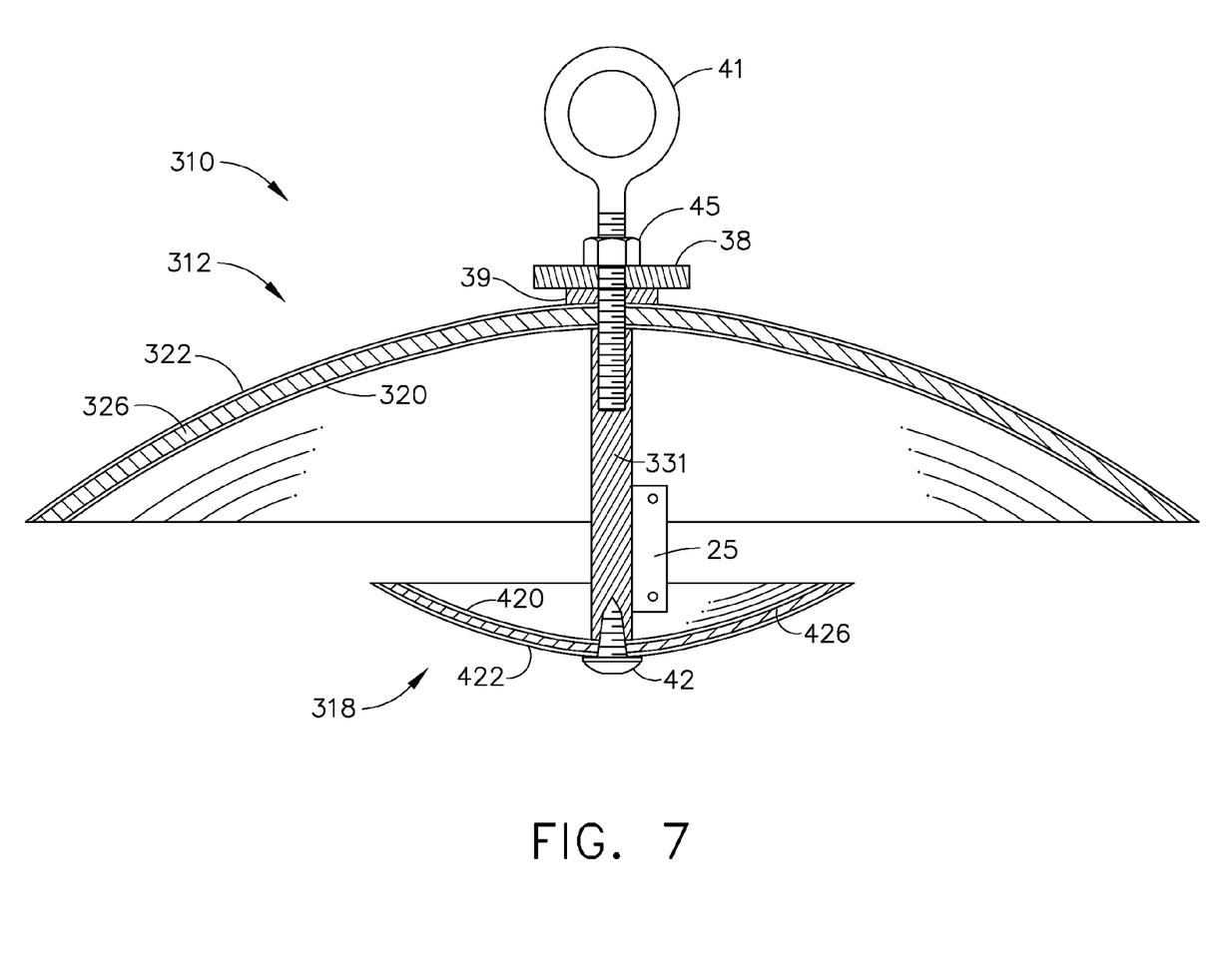
FIG. 7 is a side, elevational view in cross section of a stationary, omni-directional embodiment of a radiation compensated thermometer, as constructed according to the principles of the technology disclosed herein.

Referring now to FIG. 7, a fixed, omni-directional embodiment, generally designated by the reference numeral 310 is illustrated, which uses the same reflector/collector technique to obtain air temperature in a stationary manner. This unit 310 includes an upper radiation shield 312 and a lower radiation shield 318, which are connected by a pole (or rod) 331. A wireless temperature transmitter 25 can be used to send air temperature data to a receiver at a remote location. The parabolic shields 312 and 318 are generally made of a metal, such as aluminum, with appropriate reflective coatings. The "outer" coatings 322 and 422 can be, for example, Barium Sulfate (also known as "Blanc Fixe"), or white enamel. The "inner" coatings 320 and 420 can be, for example, Parson's Optical Black, or flat black enamel.

Figure 8:
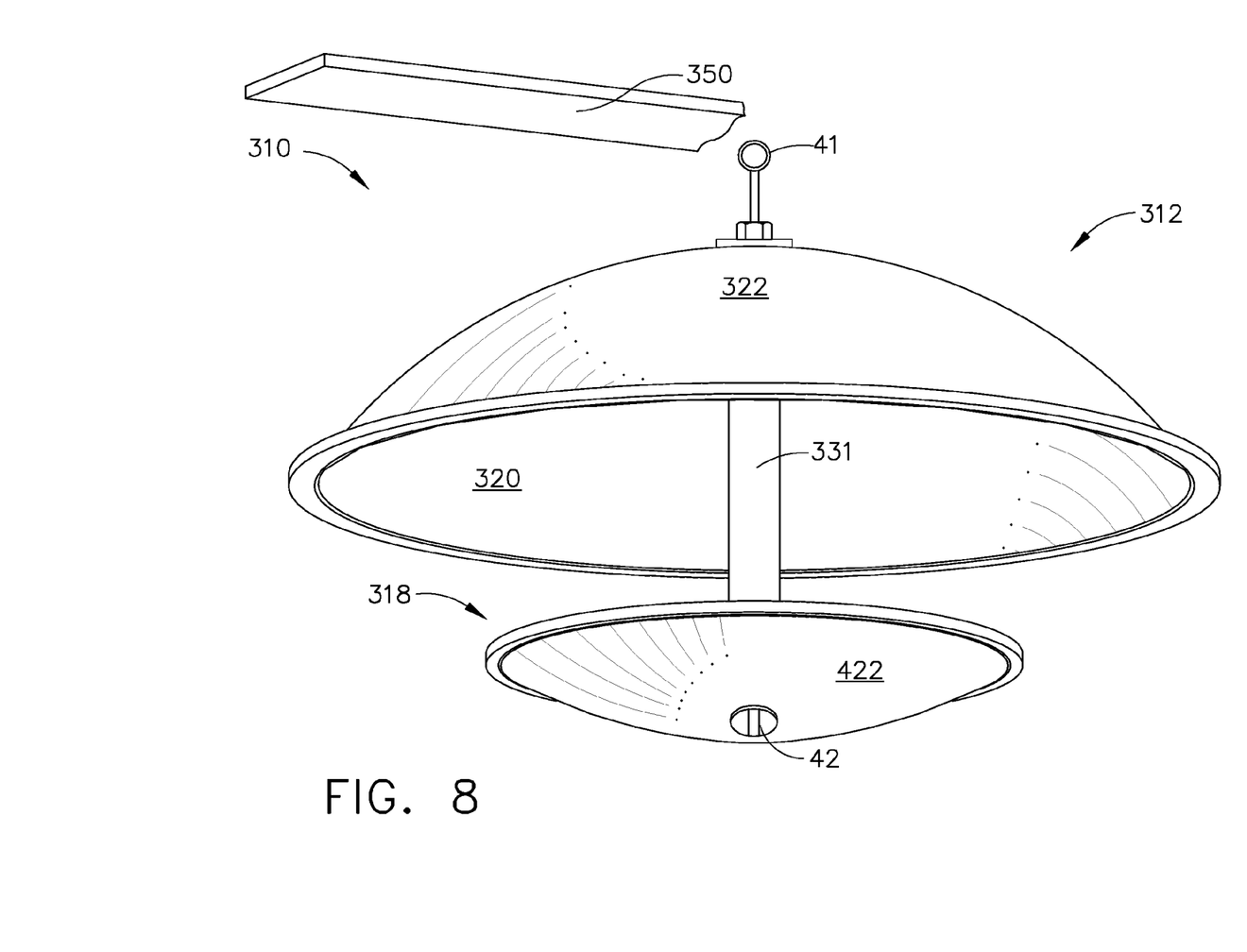
FIG. 8 is a perspective view from below of the omni-directional radiation compensated thermometer of FIG. 7, showing how its radiation shields are suspended beneath a weather sensor suite, which is a mounting that holds a cluster of meteorological instruments and sensors above the ground.

An eyebolt 41 enables the omni-directional embodiment 310 to hang from a sensor suite platform 350, as depicted in FIG. 8. The mounting hardware also includes a lock washer 45, a flat washer 38, and an insulative washer 39 (made from rubber, or another electrically insulative material). The lower parabolic shield 318 is held in place to the pole 331 by a fastener 42. The separation distance between the parabolic radiation shields 312 and 318 is much less than that of the first embodiment illustrated in FIGS. 1-3. This is necessary so as to keep the bottom (smaller) radiation shield 318 substantially in the shade produced by the upper (larger) radiation shield 312 at all sun angles, without having to move the "aim" of the omni-directional embodiment 310. In this embodiment 310, the cool layer areas will be much more likely to interact with one another; however, the "dead space" effect will probably be greater, since the air gap between the two concave substrates 326 and 426 is so much smaller—i.e., the effects of any flow of "fresh air" that otherwise might tend to upset the "still air" near the temperature sensor 25 will be greatly reduced.

Figure 9:
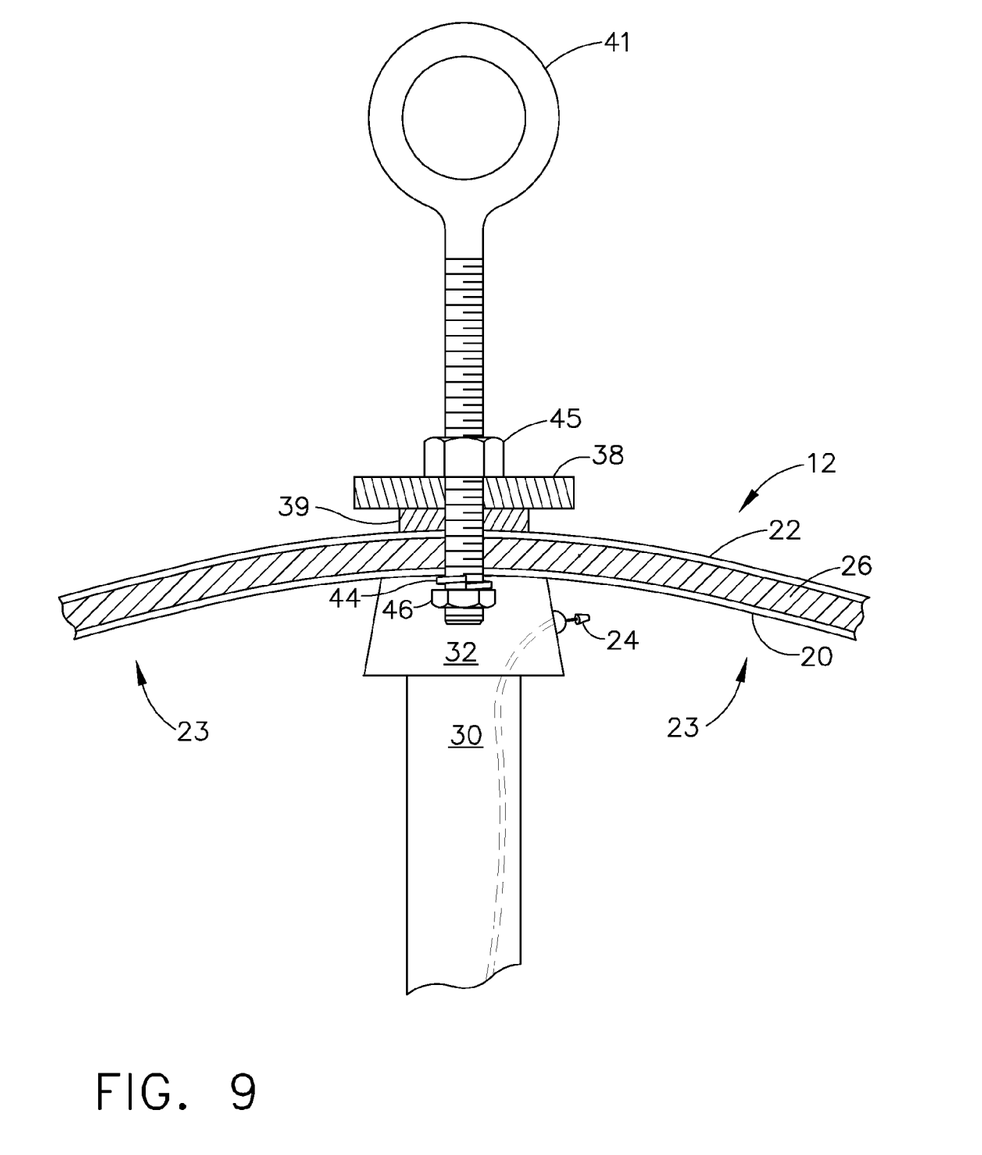
FIG. 9 is an enlarged side, elevational view in cross section of the omni-directional radiation compensated thermometer of FIG. 7, showing details of its mounting components.
Figure 10:
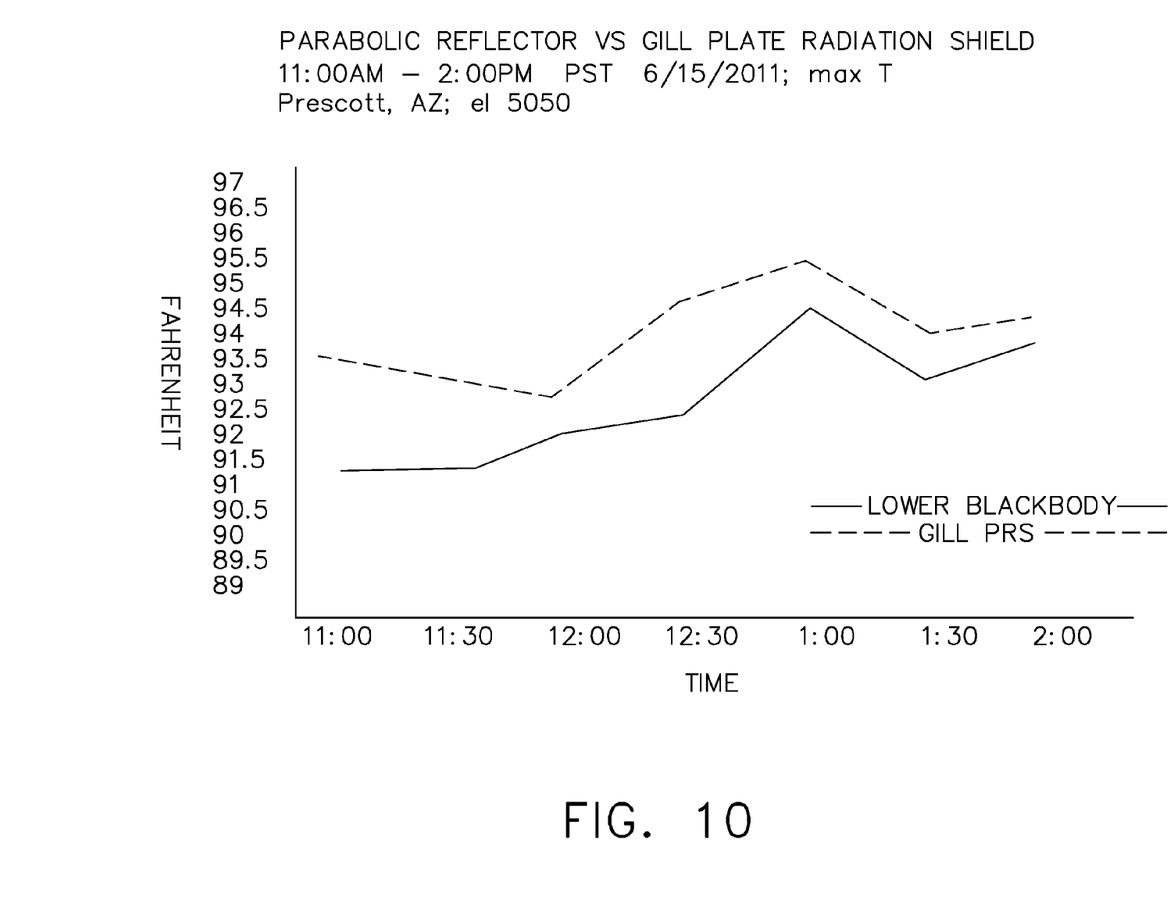
FIG. 10 is a graph showing comparative temperature readings taken by the directional radiant heat thermometer of FIG. 1 and by a standard Gill plate radiation shield thermometer, at thirty minute time intervals in a single day.
Figure 11:
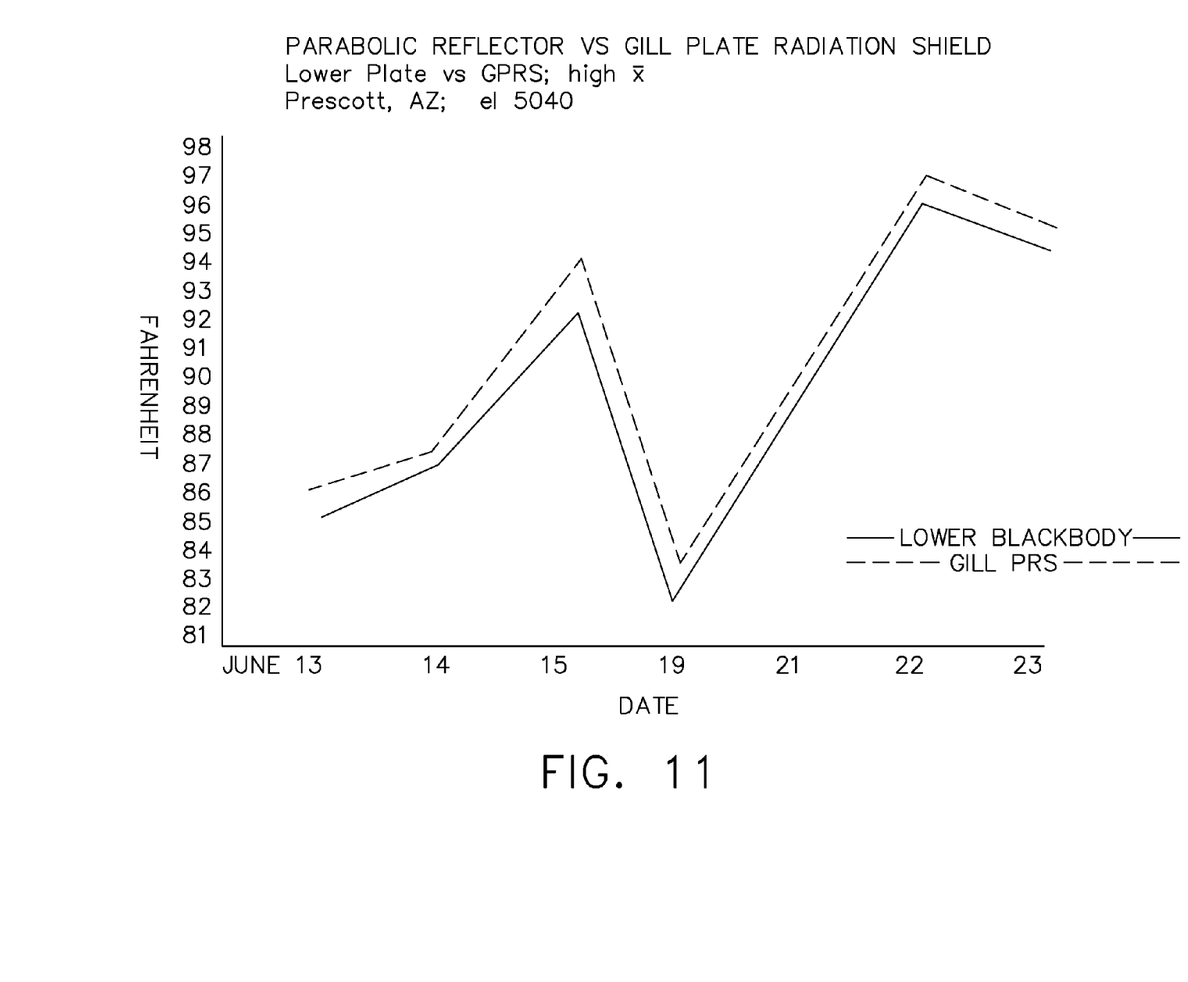
FIG. 11 is a graph showing comparative temperature readings taken by the directional radiant heat thermometer of FIG. 1 and by a standard Gill plate radiation shield thermometer, showing daily high temperature readings over seven different days.

FIG. 9 shows some mounting details for a similar construction, using PVC piping components for the mounting hardware. For example, the eyebolt 41 does not thread directly into the pole (or rod), such as the pole 331 in FIG. 7. Instead, the eyebolt 41 of FIG. 9 has a lock washer 44 and nut 46 that mount against the inner surface of a PVC end cap 32, which covers a PVC pipe 30. This mounting method can be used for a larger parabolic shield 12 (having the substrate 26, the reflective outer coating 22, and the non-reflective inner coating 20), in which this larger shield 12 is mounted vertically by the eyebolt 41. It can be seen that the various styles of temperature monitors disclosed herein can be mounted in various combinations of the illustrated mounting hardware schemes, and also in other ways not illustrated herein that are consistent with the principles of this technology.

All embodiments of the technology disclosed herein can be "automated" by mounting the holding structural members on equatorial-type drives with azimuth tracking. For example, the first embodiment illustrated in FIGS. 1-4 could have a rotating (azimuth) motor mount in its base 68, to track the rotation of the earth with respect to the sun; and it could have a declination tracking drive positioned at the swivel "T" member 4, to track the sun's elevation above the horizon as the sun transits across the sky. In this manner it can be arranged to automatically have the upper radiation shield 12 always point at the sun during the daylight hours, thereby keeping the lower radiation shield 18 in the shade.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal." Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the to above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. A radiation compensated thermometer apparatus, comprising:
   (a) a substantially circular first radiation shield subassembly, having: (i) a substantially parabolic first substrate, (ii) a first, convex outer substantially thermally reflective coating, (iii) a first, concave inner substantially thermally non-reflective coating, and (iv) a first mounting location, wherein said first substrate exhibits a first diameter;
   (b) a substantially circular second radiation shield subassembly, having: (i) a substantially parabolic second substrate, (ii) a second, convex outer substantially thermally reflective coating, (iii) a second, concave inner substantially thermally non-reflective coating, and (iv) a second mounting location, wherein said second substrate exhibits a second diameter that is smaller than said first diameter;
   (c) a longitudinal member that extends between said first mounting location and said second mounting location, so that said first and second radiation shield subassemblies are mounted such that: (i) said first, concave inner surface and said second, concave inner surface face one another, (ii) said first and second radiation shield subassemblies are spaced-apart from one another, and (iii) said first and second radiation shield subassemblies are in a substantially parallel configuration to one another;
   (d) wherein said first radiation shield subassembly exhibits a first cool layer area proximal to said first, concave inner surface, and said second radiation shield subassembly exhibits a second cool layer area proximal to said second, concave inner surface, wherein said first and second radiation shield subassemblies are sufficiently separated that said first cool layer area does not significantly interact with said second cool layer area; and
   (e) a first temperature sensor that is positioned in one of: (i) said first cool layer area, and (ii) said second cool layer area.

2. The radiation compensated thermometer apparatus of claim 1, wherein: the first diameter of said first substrate is greater than the second diameter of said second substrate by a ratio of about 2:1.

3. The radiation compensated thermometer apparatus of claim 1, wherein: the first diameter of said first substrate is greater than the second diameter of said second substrate by a ratio of greater than 2:1.

4. The radiation compensated thermometer apparatus of claim 1, wherein: said first, convex outer substantially thermally reflective coating comprises one of: (a) barium sulfate; and (b) white enamel.

5. The radiation compensated thermometer apparatus of claim 1, wherein: said first, concave inner substantially thermally non-reflective coating comprises one of: (a) Parson's optical black; and (b) black enamel.

6. The radiation compensated thermometer apparatus of claim 1, further comprising: a second temperature sensor that is positioned in one of: (i) said first cool layer area, and (ii) said second cool layer area.

7. The radiation compensated thermometer apparatus of claim 1, wherein: said longitudinal member has a length that is greater than the first diameter of said first substrate.

8. The radiation compensated thermometer apparatus of claim 7, wherein: said longitudinal member has a length that is at least twice the distance as the first diameter of said first substrate.

9. The radiation compensated thermometer apparatus of claim 1, further comprising: at least one mounting pole that holds said longitudinal member and said first and second radiation shield subassemblies above ground level, wherein said at least mounting pole is swivelable in both azimuth and declination, so as to allow for aiming said longitudinal member and said first radiation shield subassembly toward the sun, as the sun transits the sky during daylight hours.

10. The radiation compensated thermometer apparatus of claim 9, further comprising: an aiming mechanism that automatically points said longitudinal member toward the sun during daylight hours, such that said first radiation shield subassembly is closer to the sun, and said second radiation shield subassembly remains in the shade produced by said first radiation shield subassembly.

11. An omnidirectional radiation compensated thermometer apparatus, comprising:
   (a) a substantially circular first radiation shield subassembly, having: (i) a substantially parabolic first substrate, (ii) a first, convex outer substantially thermally reflective coating, (iii) a first, concave inner substantially thermally non-reflective coating, and (iv) a first mounting location, wherein said first substrate exhibits a first diameter;
   (b) a substantially circular second radiation shield subassembly, having: (i) a substantially parabolic second substrate, (ii) a second, convex outer substantially thermally reflective coating, (iii) a second, concave inner substantially thermally non-reflective coating, and (iv) a second mounting location, wherein said second substrate exhibits a second diameter that is smaller than said first diameter by a ratio of at least about 2:1;
   (c) a longitudinal member that extends between said first mounting location and said second mounting location, so that said first and second radiation shield subassemblies are mounted such that: (i) said first, concave inner surface and said second, concave inner surface face one another, (ii) said first and second radiation shield subassemblies are spaced-apart from one another, and (iii) said first and second radiation shield subassemblies are in a substantially parallel configuration to one another;
   (d) wherein a longitudinal distance, measured along a portion of a centerline between said first mounting location and said second mounting location, of a spaced-apart gap between an outermost perimeter of said substantially parabolic first substrate and an outermost perimeter of said substantially parabolic second substrate, is less than said first diameter;

(e) said first radiation shield subassembly exhibits a first cool layer area proximal to said first, concave inner surface, and said second radiation shield subassembly exhibits a second cool layer area proximal to said second, concave inner surface; and (e) a first temperature sensor that is positioned in one of: (i) said first cool layer area, and (ii) said second cool layer area.

12. The radiation compensated thermometer apparatus of claim 11, wherein: the first diameter of said first substrate is greater than the second diameter of said second substrate by a ratio of about 2:1.

13. The radiation compensated thermometer apparatus of claim 11, wherein: the first diameter of said first substrate is greater than the second diameter of said second substrate by a ratio of greater than 2:1.

14. The radiation compensated thermometer apparatus of claim 11, wherein: said first, convex outer substantially thermally reflective coating comprises one of: (a) barium sulfate; and (b) white enamel.

15. The radiation compensated thermometer apparatus of claim 11, wherein: said first, concave inner substantially thermally non-reflective coating comprises one of: (a) Parson's optical black; and (b) black enamel.

16. The radiation compensated thermometer apparatus of claim 11, further comprising: a second temperature sensor that is positioned in one of: (i) said first cool layer area, and (ii) said second cool layer area.

17. A directional radiation compensated thermometer apparatus, comprising:

(a) a base structure having a plurality of elongated mounting channels at different locations in a top surface of the base structure;

(b) a first reflector/collector assembly, comprising:
  (i) a first elongated mounting member;
  (ii) a substantially circular first radiation shield subassembly, having: (A) a substantially parabolic first substrate, (B) a first, convex outer substantially thermally reflective coating, (C) a first, concave inner substantially thermally non-reflective coating, and (D) a first mounting location that attaches the first radiation shield subassembly to said first elongated mounting member, wherein said first substrate exhibits a first diameter; and
  (iii) said first elongated mounting member being placed into a first channel of said plurality of elongated mounting channels, thereby holding said first radiation shield subassembly at a first distance above said base structure;

(c) a second reflector/collector assembly, comprising:
  (i) a second elongated mounting member;
  (ii) a substantially circular second radiation shield subassembly, having: (A) a substantially parabolic second substrate, (B) a second, convex outer substantially thermally reflective coating, (C) a second, concave inner substantially thermally non-reflective coating, and (D) a second mounting location that attaches the second radiation shield subassembly to said second elongated mounting member, wherein said second substrate exhibits a second diameter that is smaller than said first diameter; and
  (iii) said second elongated mounting member being placed into a second channel of said plurality of elongated mounting channels, thereby holding said second radiation shield subassembly at a second distance above said base structure;

(d) wherein said first distance is greater than said second distance, so that said first and second radiation shield subassemblies are arranged at different heights;

(e) said first and second radiation shield subassemblies are mounted such that: (i) said first, concave inner surface and said second, concave inner surface face one another, and (ii) said first and second radiation shield subassemblies are spaced-apart from one another;

(f) wherein said first radiation shield subassembly exhibits a first cool layer area proximal to said first, concave inner surface, and said second radiation shield subassembly exhibits a second cool layer area proximal to said second, concave inner surface, wherein said first and second radiation shield subassemblies are sufficiently separated that said first cool layer area does not significantly interact with said second cool layer area; and (g) a first temperature sensor that is positioned in one of: (i) said first cool layer area, and (ii) said second cool layer area.

18. The directional radiation compensated thermometer apparatus of claim 17, wherein said first elongated mounting member is of a different length than said second elongated mounting member.

19. The directional radiation compensated thermometer apparatus of claim 17, wherein at least one of said first and second elongated mounting members includes an adjustable angle member.

20. The directional radiation compensated thermometer apparatus of claim 17, wherein said base structure is substantially portable, so that it is movable by hand to keep an azimuth angle between said first and second reflector/collector assemblies aiming substantially toward the sun, thereby keeping said second reflector/collector assembly in the shade produced by said first reflector/collector assembly.

* * * * *